Patented Dec. 30, 1941

2,267,777

UNITED STATES PATENT OFFICE 2,267,777

STABILIZED VINYL RESIN

Victor Yngve, Lakewood, Ohio, assignor to Carbide and Carbon Chemicals Corporation, a corporation of New York No Drawing. Application June 23, 1938,
Serial No. 215,411

6 Claims. (Cl. 260—86)

The invention relates to stabilized vinyl resins and compositions containing the same. It is particularly concerned with new and improved stabilizing materials which show definite advantages in preventing deterioration of vinyl resins at elevated temperatures.

As synthetic resinous bodies vinyl resins are well known in the art, and their valuable properties as components of plastic compositions of various sorts have been recognized. In the compounding and processing of such resins into molded and extruded articles, or as constituents of certain coating compositions it is usually necessary to subject the plastics to certain degrees of heat. Under such conditions, as well as at elevated temperatures which may be encountered in normal usage, a tendency toward deterioration is quite commonly encountered. To prevent decomposition in this respect it has, therefore, been considered essential with known types of vinyl resin to incorporate therewith additive materials adapted to exert a stabilizing action, and numerous compounds have been suggested for this purpose.

Improvements afforded by this invention are especially applicable to vinyl resins of the type produced by the more or less complete polymerization of a vinyl halide, such as vinyl chloride, or by the conjoint polymerization of mixtures of vinyl halides with vinyl esters of aliphatic acids. Resins of the latter type are described in U. S. Patent 1,935,577 to E. W. Reid, and among these, the conjointly polymerized product of vinyl chloride and vinyl acetate containing about 60% to 95% of vinyl chloride in the polymer, and having an average molecular weight of from about 5,000 to 20,000, as estimated from the specific viscosity of dilute solutions according to Staudinger's method, is especially susceptible to stabilization by the compounds hereinafter described.

In accordance with my invention I have found that organo-metallic compounds of lead and tin, particularly the oxides and hydroxides of alkyl and aryl derivatives of these metals will function as excellent stabilizers for vinyl resins, and when intimately dispersed therein will provide plastic compositions of substantially improved resistance to heat deterioration. A particular advantage in these compounds, other than their actual stabilizing function, also resides in the fact that resin compositions incorporating them show practically no tendency toward discoloration in the presence of hydrogen sulfide, thereby presenting an especially valuable application of the materials in vinyl resin plastics which may be contacted with sulfur compounds.

A quite broad class of these alkyl and aryl lead and tin oxides and hydroxides have shown a very satisfactory stabilizing action. Among the compounds having an alkyl group those are especially preferred which contain in the alkyl radical three or more carbon atoms, as included in the propyl, isopropyl, butyl, isobutyl, tertiary butyl, the various amyl groups, and the like. As aryl derivatives those containing phenyl, tolyl, xylyl and naphthyl groups are typical. A mixed hydrocarbon grouping in either the oxide or hydroxide compound is also appropriate, which may include two or more different alkyl radicals in the molecule or mixed aryl and alkyl groups. Representative specific compounds especially effective in their stabilizing action are the following:

| | |
|---|---|
| Triphenyl tin hydroxide | $(C_6H_5)_3SnOH$ |
| Diphenyl tin oxide | $(C_6H_5)_2SnO$ |
| Propyl diphenyl tin hydroxide | $(C_3H_7)(C_6H_5)_2SnOH$ |
| Diphenyl lead oxide | $(C_6H_5)_2PbO$ |
| Triphenyl lead hydroxide | $(C_6H_5)_3PbOH$ |
| Propyl diphenyl lead hydroxide | $(C_3H_7)(C_6H_5)_2PbOH$ |
| Tributyl tin hydroxide | $(C_4H_9)_3SnOH$ |
| Dibutyl tin oxide | $(C_4H_9)_2SnO$ |
| Tributyl lead hydroxide | $(C_4H_9)_3PbOH$ |
| Dibutyl lead oxide | $(C_4H_9)_2PbO$ |

All of the above and related compounds are intended to be included within the broader scope of the invention, and within the classification which may be defined as organo-metallic lead and tin oxides and hydroxides, that is, organo-metallic compounds in which the inorganic constituent is of the group consisting of lead and tin radicals in combination with oxide and hydroxide radicals. The stabilizing compounds previously described may be designated broadly by the formula $(R_1)_xM(R)$ where $R_1$ is a radical of the group of alkyl and aryl, M is a tetravalent metal of the group of tin and lead, R is one of the group of oxygen and hydroxyl, $x$ is an integer from 2 to 3, $x$ being 2 when R is oxygen and $x$ being 3 when R is hydroxyl.

As an example of the effectiveness of these new stabilizers a very small quantity of triphenyl tin hydroxide was incorporated in a vinyl resin plastic composition. The resin employed was one formed by conjoint polymerization of vinyl chloride and vinyl acetate, containing about 87% vinyl chloride in the polymer, and having an average molecular weight of from about 8,000 to 12,000. The triphenyl tin hydroxide, in quantities about 1.0% by weight of the resin, was intimately and thoroughly dispersed in the resinous mass by milling on a heated two roll mill. In subsequent processing at elevated temperatures the plastic remained clear, and under heat tests at 135° C. the resistance to deterioration as evidenced by discoloring or blackening of the resin was very good.

Using a polymerized vinyl resin similar to that in the above example, a lacquer composition was made up containing varying proportions, from about 1% to 5% by weight of the resin, of triphenxy tin hydroxide as a stabilizer. Clear solutions of the stabilized resin were sprayed in thin films onto steel panels and the coated panels baked at various temperatures. Films containing from 2% to 5% concentration of the triphenyl tin hydroxide showed no apparent decomposition when baked for 30 minutes at a temperature of 350° F., whereas a film of similar resin, but without the stabilizer, blackened and decomposed entirely in 5 minutes under the same conditions.

Further tests employing other organo-metallic oxides and hydroxides of lead and tin showed results comparative to the above examples, and in all instances heat stability of the vinyl resin plastic was appreciably improved over compositions of the same resin component but with prior known stabilizing materials.

To incorporate the stabilizer within the resin composition methods heretofore known may be employed which will effect an intimate dispersion thereof throughout the resin mass. The amounts necessary to effect desirable heat stability are also within a range heretofore found suitable with other materials, varying from about 0.5% to about 5.0% by weight of the vinyl resin. In the compounding of plastic compositions for various uses, there may be included any of the common solvents, plasticizers, pigments, and other modifying materials without detrimental effect upon the heat stability afforded by these new stabilizers.

Modifications within the scope of the appended claims will be evident and are intended to be included within the invention as defined therein. This application is a continuation-in-part of my copending application Serial No. 118,568, filed December 31, 1936, now Patent No. 2,219,463.

I claim:

1. A heat-stable resinous composition comprising a vinyl resin substantially identical with that formed by the conjoint polymerization of vinyl chloride with vinyl acetate and containing in the polymer about 60% to 95% of vinyl chloride, and a stabilizing material intimately dispersed therein, said stabilizing material comprising about 0.5% to 5.0% by weight of the resin of triphenyl tin hydroxide.

2. A heat-stable vinyl resin composition including polymerized vinyl halide, said composition containing intimately dispersed therein a stabilizing material comprising an organo-metallic compound in which the inorganic constituent is of the group consisting of lead and tin radicals in combination with oxygen and hydroxyl radicals.

3. A heat-stable vinyl resin composition including polymerized vinyl halide, said composition containing intimately dispersed therein a stabilizing material comprising a member of the group designated by the formula $(R_1)_xM(R)$ where $R_1$ is a radical of the group of alkyl and aryl, M is a tetravalent metal of the group of tin and lead, R is one of the group of oxygen and hydroxyl, $x$ is an integer from 2 to 3, $x$ being 2 when R is oxygen and $x$ being 3 when R is hydroxyl.

4. A heat-stable resinous composition comprising a vinyl resin substantially identical with that formed by the conjoint polymerization of a vinyl halide with a vinyl ester of an aliphatic acid and containing in the polymer about 60% to 95% of the vinyl halide, and a stabilizing material intimately dispersed therein, said stabilizing material comprising a member of the group designated by the formula $(R_1)_xM(R)$ where $R_1$ is a radical of the group of alkyl and aryl, M is a tetravalent metal of the group of tin and lead, R is one of the group of oxygen and hydroxyl, $x$ is an integer from 2 to 3, $x$ being 2 when R is oxygen and $x$ being 3 when R is hydroxyl.

5. Process for producing heat-stable resinous compositions which comprises intimately mixing a vinyl resin including polymerized vinyl halide with a stabilizing material comprising an organo-metallic compound in which the inorganic constituent is of the group consisting of lead and tin radicals in combination with oxygen and hydroxyl radicals.

6. Process for producing heat-stable resinous compositions which comprises intimately mixing a vinyl resin substantially identical with that formed by the conjoint polymerization of vinyl chloride with vinyl acetate and containing in the polymer about 60% to 95% vinyl chloride with a stabilizing material comprising a member of the group designated by the formula $(R_1)_xM(R)$ where $R_1$ is a radical of the group of alkyl and aryl, M is a tetravalent metal of the group of tin and lead, R is one of the group of oxygen and hydroxyl, $x$ is an integer from 2 to 3, $x$ being 2 when R is oxygen and $x$ being 3 when R is hydroxyl.

VICTOR YNGVE.

CERTIFICATE OF CORRECTION.

Patent No. 2,267,777. December 30, 1941.

VICTOR YNGVE.

It is hereby certified that error appears in the printed specification of the above numbered patent requiring correction as follows: Page 1, second column, line 31, for "Tibutyl" read --Tributyl--; page 2, first column, line 15, for "phenxy" read --phenyl--; and that the said Letters Patent should be read with this correction therein that the same may conform to the record of the case in the Patent Office.

Signed and sealed this 10th day of February, A. D. 1942.

(Seal)
Henry Van Arsdale,
Acting Commissioner of Patents.